(12) United States Patent
Kawabata et al.

(10) Patent No.: US 12,010,278 B2
(45) Date of Patent: Jun. 11, 2024

(54) IMAGE READING APPARATUS INCLUDING HEIGHT ADJUSTMENT MECHANISM WITHOUT INCREASING OVERALL SIZE THEREOF

(71) Applicant: Seiko Epson Corporation, Tokyo (JP)

(72) Inventors: Seiji Kawabata, Matsumoto (JP); Kazunori Mori, Matsumoto (JP); Masato Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/654,729

(22) Filed: Mar. 14, 2022

(65) Prior Publication Data

US 2022/0303412 A1  Sep. 22, 2022

(30) Foreign Application Priority Data

Mar. 16, 2021 (JP) ................. 2021-042108

(51) Int. Cl.
*H04N 1/00* (2006.01)
(52) U.S. Cl.
CPC ..... *H04N 1/00554* (2013.01); *H04N 1/00559* (2013.01)
(58) Field of Classification Search
None
See application file for complete search history.

(56) References Cited

U.S. PATENT DOCUMENTS

2011/0235131 A1* 9/2011 Hanamoto ......... H04N 1/00557
358/474
2017/0155782 A1* 6/2017 Okazawa ........... H04N 1/00557

FOREIGN PATENT DOCUMENTS

| JP | 2002131990 A | * | 5/2002 | |
|---|---|---|---|---|
| JP | 2004357370 A | * | 12/2004 | .......... G03G 15/605 |
| JP | 2014-030144 | | 2/2014 | |
| JP | 2014030144 A | * | 2/2014 | |
| JP | 2016173470 A | * | 9/2016 | |

OTHER PUBLICATIONS

JP-2016173470A English Translation (Year: 2016).*
JP-2002131990-A English Translation (Year: 2002).*
JP-2004357370-A English Translation (Year: 2004).*

* cited by examiner

*Primary Examiner* — Miya J Cato
(74) *Attorney, Agent, or Firm* — WORKMAN NYDEGGER

(57) ABSTRACT

An image reading apparatus includes a document bed on which a document is placed, an automatic document feeder (an example of an opening/closing member) configured to be opened/closed with respect to the document bed, a rotational supporting section provided at one end of the document bed and rotatably supporting the automatic document feeder with respect to the document bed, and a height adjustment mechanism that adjusts the height of the automatic document feeder relative to the document bed. The rotational supporting section has a holding section fixed to the document bed and a rotary fulcrum section attached to the holding section and being movable in the up-down direction relative to the holding section. The height adjustment mechanism adjusts the height of the rotary fulcrum section relative to the holding section to adjust the height of the automatic document feeder relative to the document bed and overlaps the holding section and the rotary fulcrum section in the vertical direction.

9 Claims, 8 Drawing Sheets

IMAGE READING APPARATUS INCLUDING HEIGHT ADJUSTMENT MECHANISM WITHOUT INCREASING OVERALL SIZE THEREOF

The present application is based on, and claims priority from JP Application Serial Number 2021-042108, filed Mar. 16, 2021, the disclosure of which is hereby incorporated by reference herein in its entirety.

BACKGROUND

1. Technical Field

The present disclosure relates to an image reading apparatus in which an opening/closing member such as a document bed cover is mounted to be opened/closed with respect to a document bed.

2. Related Art

An image reading apparatus such as scanner has been known. The image reading apparatus includes a document bed on which a document is placed, and a document bed cover that presses the document placed on the document bed. This type of image reading apparatus may include an automatic document feeder onto the document bed cover which automatically feeds the document. In either case, the document bed cover is openably attached to the document bed via a hinge mechanism.

For example, JP-A-2014-30144 discloses an opening/closing apparatus (hinge mechanism) that openably and vertically movably supports a document pressing member (document bed cover) on an image reading apparatus having a document mounting bed (an example of the document bed). The opening/closing apparatus includes an attachment section fixed to the document pressing member, a hinge reception member that vertically movably supported by the image reading apparatus and vertically movably supports a sliding section of the attachment section, and a hinge height adjustment mechanism (an example of a height adjustment mechanism) that changes the height of the hinge reception member relative to the image reading apparatus. The height adjustment mechanism is disposed below the hinge reception member.

However, In the image reading apparatus described in JP-A-2014-30144, since the height adjustment mechanism is disposed below the hinge reception member, the hinge mechanism (opening/closing apparatus) itself becomes large in height. The increased height of the hinge mechanism disadvantageously increases the image reading apparatus in height.

SUMMARY

An image reading apparatus according to an aspect of the present disclosure to solve the above-described problem includes: a document bed on which a document is placed; an opening/closing member configured to be opened/closed with respect to the document bed; a rotational supporting section provided at one end of the document bed and configured to support the opening/closing member to rotate with respect to the document bed; and a height adjustment mechanism that adjusts a height of the opening/closing member relative to the document bed. The rotational supporting section includes: a holding section fixed to the document bed; and a rotary fulcrum section attached to the holding section and configured to be moved in the up-down direction relative to the holding section. The height adjustment mechanism adjusts a height of the rotary fulcrum section relative to the holding section to adjust the height of the opening/closing member relative to the document bed and overlaps the holding section and the rotary fulcrum section in a vertical direction.

DESCRIPTION OF EXEMPLARY EMBODIMENT

An embodiment will be described below with reference to figures. A multifunctional printer that is an example of a medium transport apparatus has a plurality of functions including an image reading function (scanning function) of outputting an image of a read document as image data, a copy function of printing the image of the read document on a medium, and a print function of printing characters and images on a medium. The multifunctional printer may include a facsimile function.

In the figures, the multifunctional printer 11 is assumed to be placed on a horizontal installation plane F. Of the Z axis orthogonal to the installation plane F of the multifunctional printer 11, the side on the multifunctional printer 11 relative to the installation plane F is defined as +z-side, and the opposite side to the +z-side is defined as −z-side. Of the in-plane direction of the installation plane F, two orthogonal axes are defined as X axis and Y axis. Directions that are parallel to the X axis, the Y axis, and the Z axis are defined as X axis direction, Y axis direction, and Z axis direction, respectively. The X axis direction includes both +X direction and −X direction. The Y axis direction includes both +Y direction and −Y direction. The Z axis direction includes both +Z direction and −Z direction. The Z axis direction parallel to the Z axis is also referred to as vertical direction Z. The X axis direction is width direction when the multifunctional printer 11 is viewed from the front face. Thus, the direction parallel to the X axis is also referred to as width direction X. The front face described herein of the multifunctional printer 11 is a face located on the side where an operation section 14 operated by the user to provide an instruction to the multifunctional printer 11 is provided. The Y axis is parallel to the depth direction of the multifunctional printer 11. Thus, the Y axis direction is also referred to as depth direction Y.

Configuration of Multifunctional Printer

Figure 1:
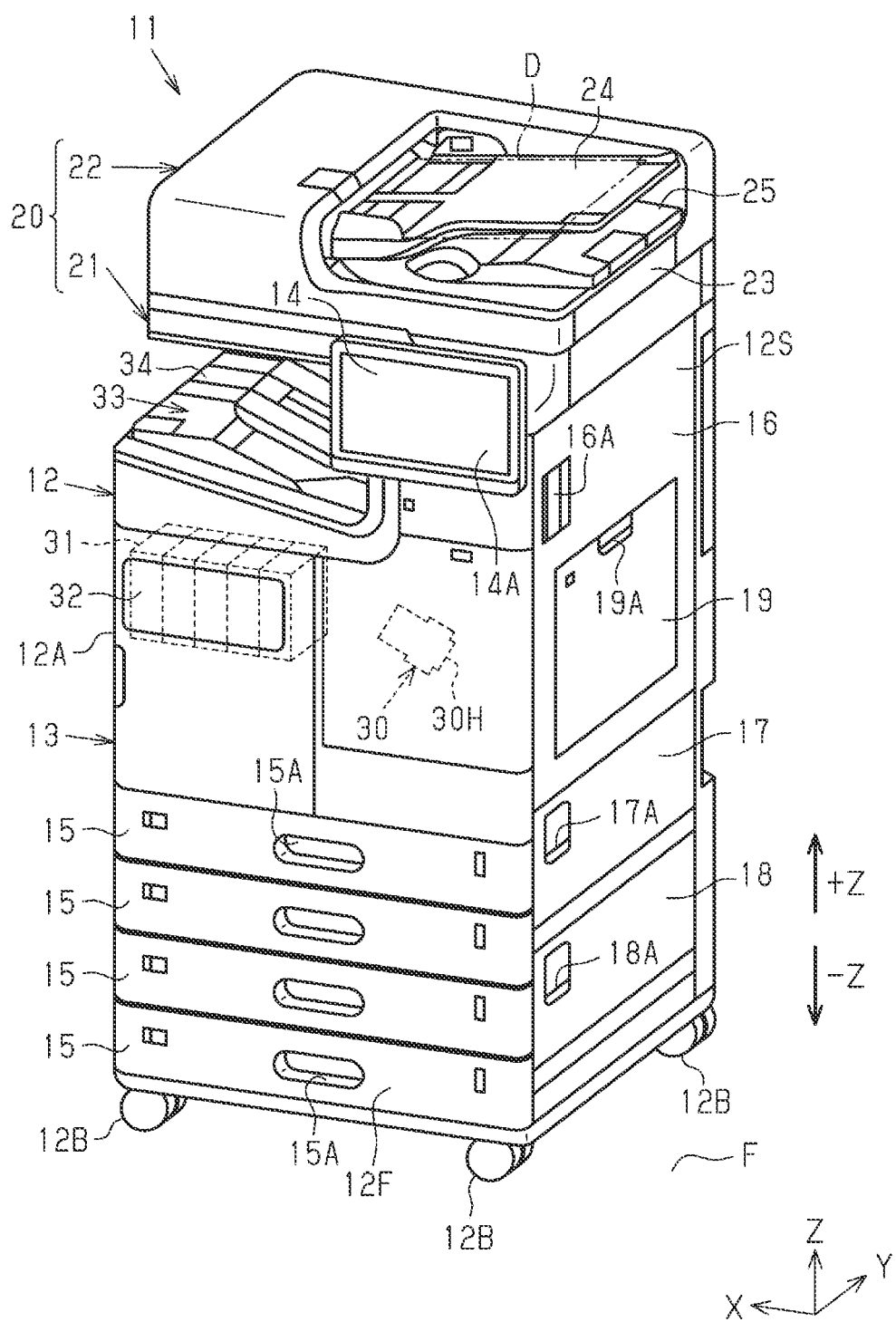
FIG. 1 is a perspective view illustrating a multifunctional printer in an embodiment.

As illustrated in FIG. 1, the multifunctional printer 11 includes a body 12 shaped like a rectangular prism, and an image reading apparatus 20 disposed on the body 12. The image reading apparatus 20 includes a document bed 21 on which a document is placed, and an automatic document feeder 22 (Auto Document Feeder (ADF)) that is an example of an opening/closing member provided to be opened/closed with respect to the document bed 21. The automatic document feeder 22 is configured to be opened/closed about a rotary fulcrum with respect to the document bed 21. The automatic document feeder 22 has a function of automatically feeding the document. The document bed 21 is fixed to an upper end of the body 12. The automatic document feeder 22 in the present embodiment is mounted integrally with a document bed cover 23. That is, a lower portion of the automatic document feeder 22, which is opposed to the document bed 21, serves as the document bed cover 23. For this reason, the document bed cover 23 is opened/closed by the automatic document feeder 22 rotating about the rotary fulcrum with respect to the document bed 21.

The body 12 constitutes a printer section 13. The multifunctional printer 11 has the configuration in which the printer section 13, the document bed 21, and automatic document feeder 22 are stacked from the bottom in the vertical direction Z. The multifunctional printer 11 is installed on the installation plane F with a plurality of casters 12B provided on the bottom of the body 12 being grounded.

The image reading apparatus 20 can read images of texts and pictures that are recorded on a document D. The automatic document feeder 22 has a document tray 24 on which the document D (two-dot chain line in FIG. 1) can be placed. The image reading apparatus 20 performs, as a mode of reading the document D, a feeding mode of reading the document D fed by the automatic document feeder 22 from the document tray 24, and a flat bed mode of reding the document D placed on the document bed 21 (refer to FIG. 3). The automatic document feeder 22 includes an ejection tray 25 on which the document D read according to the feeding mode. In reading the document D according to the flat bed mode, the document D is placed on an upper face of the document bed 21 exposed when the automatic document feeder 22 is opened, and the automatic document feeder 22 is closed to press the document D with the document bed cover 23. According to the flat bed mode, the image reading apparatus 20 reads the document D on the document bed 21.

An upper portion of a front face 12F of the body 12 is provided with the operation section 14 used to provide an instruction to the multifunctional printer 11. The operation section 14 may be an operation panel having a display section 14A. The display section 14A may a screen formed of a touch panel, for example. The touch panel is a display panel that can be touched to provide an instruction to the multifunctional printer 11. The operation section 14 may have operation buttons or may be configured of only operation buttons. In this example, a face opposed to the face (for example, the panel face) of the operation section 14 in the body 12 is the front face.

The multifunctional printer 11 includes cassettes 15 (medium storage sections) that stores a plurality of media. The cassettes 15 store the plurality of stacked media. The multifunctional printer 11 includes the cassette 15 consisting of a plurality of tiers (four tiers in the example in FIG. 1) disposed in the lower portion of the body 12 so as to be stacked in the vertical direction Z. The plurality of cassettes 15 are removably inserted into the body 12. The cassette 15 each have a handle 15A used to be drawn by the user. The number of cassettes 15 may be set to any number, not limited to four, including one, two, three, five, and six. The multitier cassettes 15 may be additional units optionally added wholly or in part.

As illustrated in FIG. 1, a side face 12S of the body 12 is provided with a first cover 16, a second cover 17, and a third cover 18 in the opened/closed state. The covers 16 to 18 have handles respective handles 16A to 18A used to be opened/closed by the user. The covers 16 to 18 each are opened/closed to resolve a medium jam that may occur on a transport path in the body 12. The first cover 16 includes an opening/closing feeding tray 19 on which the medium can be placed. The user uses a handle 19A to open the feeding tray 19, enabling the medium placed on the feeding tray 19 to be fed. The covers 16 to 18 along with a frame and an exterior of the body 12 constitute a housing 12A of the printer section 13.

As illustrated in FIG. 1, a record section 30 that performs recording on the medium (refer to FIG. 2) is disposed in the housing 12A. A transport section (not illustrated) that transports the medium fed from the cassette 15 and the medium fed from the feeding tray 19 along the transport path (not illustrated) is provided in the housing 12A. The record section 30 performs recording on the medium at a record position in the middle of the transport path. A liquid supply source 31 that contains ink that is an example of liquid is housed in the housing 12A. The record section 30 has a liquid ejection head 30H that performs recording on the medium using liquid such as ink supplied from the liquid supply source 31. The front face 12F of the housing 12A is provided with a window 32 at an area corresponding to the liquid supply source 31. The user can view the residual quantity of the liquid supply source 31 through the window 32. The liquid supply source 31 is constituted of a plurality of tanks or cartridges that contains different types of liquid such as ink.

A concave ejection section 33 is provided between the body 12 and the image reading apparatus 20. The ejection section 33 includes an ejection tray 34 that constitutes the bottom of the election section. The recorded medium ejected through an ejection port (not illustrated) is stacked on an upper face of the ejection tray 34.

The multifunctional printer 11 includes a control section (not illustrated) in the body 12. The control section controls the printer section 13 and the image reading apparatus 20. The control section includes a CPU (Central Processing Unit), a ROM (Read only Memory), a RAM (Random Access Memory), and a storage, which are not illustrated. The control section controls the automatic document feeder 22 and a reading section 45 (refer to FIG. 3) to allow the image reading apparatus 20 to read the document D. The control section controls the record section 30 and the transport section (not illustrated) to allow the printer section 13 to transport the medium and perform recording on the medium.

Configuration of Image Reading Apparatus

Next, detailed configuration of the image reading apparatus 20 will be described.

Figure 2:
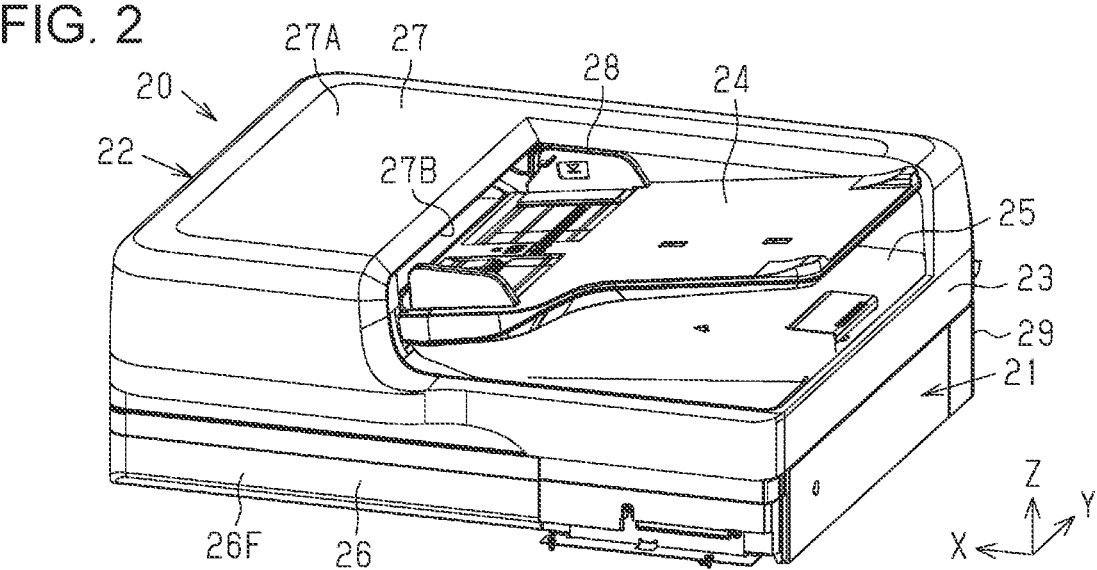
FIG. 2 is a perspective view illustrating an image reading apparatus.

As illustrated in FIG. 2, the image reading apparatus 20 includes the substantially rectangular prism-shaped document bed 21, and the automatic document feeder 22 disposed above the document bed 21 in the vertical direction Z. The document bed 21 includes a housing 26 having a framework (not illustrated) and an exterior. The automatic document feeder 22 is configured to be opened/closed with respect to the housing 26 of the document bed 21. The automatic document feeder 22 includes a feeding mechanism 27 that feeds the document D placed on the document tray 24 and ejects the document D read in the middle of the feeding path onto the ejection tray 25. The document tray 24 includes a pair of edge guides 28 capable of adjusting the position of the placed document D in the width direction. The pair of edge guides 28 is configured to be slidable in the width direction of the document D. A bottom of the automatic document feeder 22 serves as the document bed cover 23. In other words, the automatic document feeder 22 is mounted on the document bed cover 23.

The automatic document feeder 22 sequentially feeds a plurality of documents D set on the document tray 24 by the feeding mechanism 27 one by one, and sequentially ejects the read document D onto the ejection tray 25. The feeding mechanism 27 has a housing 27A with an opened feeding port 27B. A feeding roller and a transport roller that are disposed on the feeding path and a driving source such as a motor for the rollers (both are not illustrated) are provided in the housing 27A. The housing 27A may build a reading section (not illustrated) such as a line sensor that reads the document D being transported.

Figure 3:
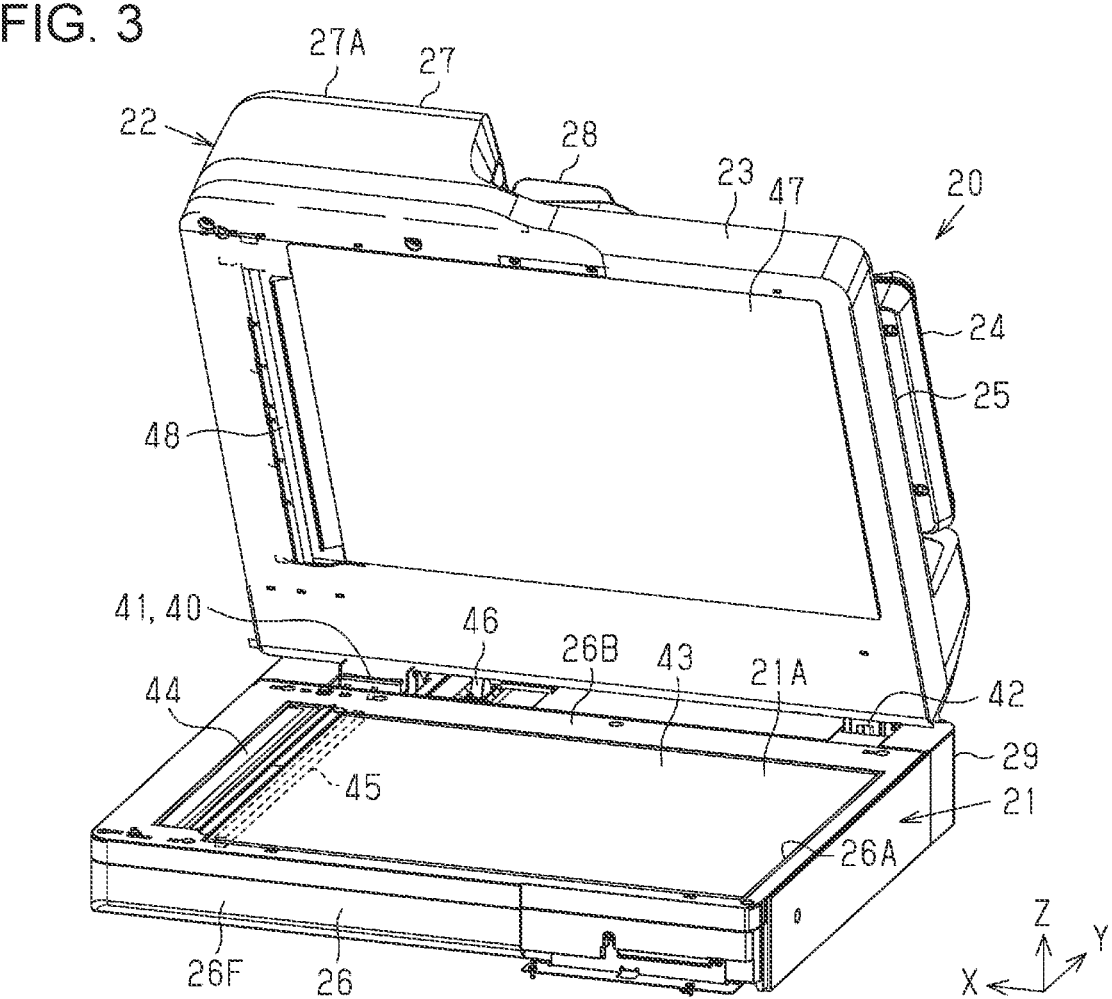
FIG. 3 is a perspective view illustrating the image reading apparatus with a document bed cover opened.

As illustrated in FIG. 3, the image reading apparatus 20 includes a pair of hinge mechanisms 41, 42 that are provided at one end (end on the side of the depth direction Y) of the document bed 21, and rotates the automatic document feeder 22 that is an example of the opening/closing member with respect to the document bed 21. The automatic document feeder 22 is openably/closeably coupled to the document bed 21 via the pair of hinge mechanisms 41, 42. Specifically, the document bed cover 23 that mounts the automatic document feeder 22 is openably/closeably coupled to the document bed 21 via the pair of hinge mechanisms 41, 42. Thereby, the automatic document feeder 22 is opened or closed via the hinge mechanisms 41, 42 between a closed state where an upper face 21A of the document bed 21 is covered and an opened state where the upper face 21A of the document bed 21 is exposed. The automatic document feeder 22 can hold the plurality of degrees of opening by using the function of the hinge mechanisms 41, 42. The largest degree of opening is a predetermined value within a range of, for example, 50 to 90 degrees.

As illustrated in FIG. 3, the document bed 21 includes a rectangular glass plate 43 assembled to an opening 26A opened to the upper face of the housing 26, and a reading window 44 formed of a small glass assembled at a position adjacent to the glass plate 43 in the width direction X. The glass plate 43 and the reading window 44 are held on the upper face of the housing 26 with a predetermined shape of frame 26B that presses their perimeters. The document bed 21 includes the moveable reading section 45 that can move in the width direction X below the glass plate 43. A sensor 46 capable of detecting the document bed cover 23 is provided at the back of the upper face of the housing 26. The sensor 46 can detect the opened/closed state of the document bed cover 23.

A document pressing face 47 that presses the document D placed on the glass plate 43 in an area opposed to the glass plate 43 is formed on the back face of the document bed cover 23. The document pressing face 47 exhibits, for example, white, and functions as a background plate read as the background of the document D on the glass plate 43. A reading path 48, in which the document D fed from the feeding mechanism 27 is temporarily exposed, is formed on the back face of the document bed cover 23 in the area corresponding to the reading window 44. According to the flat bed mode, the document D is read by reading an image of the document D on the glass plate 43 while the reading section 45 moves in the width direction X (sub scanning direction). According to the feeding mode, an image of the document D transported by the feeding mechanism 27 is read by the reading section 45 that waits at the position corresponding to the reading window 44 through the reading path 48. The image reading apparatus 20 may have the double reading function of reading both surfaces of the document D using a reading section (not illustrated) in the housing 27A and the reading section 45 in the document bed 21.

The reading section 45 has a carriage provided to be movable in the width direction X along a rail installed in the housing 26, and a line sensor and a light source (both are not illustrated) that are mounted on the carriage. The light source illuminates a reading area of the document D set on the document bed 21 with light. The reading section 45 reciprocates in the width direction X via an endless belt rotated normally and reversely by driving of an electric motor that is an example of a driving source.

When reading the document D fed from the feeding mechanism 27 of the automatic document feeder 22, the reading section 45 waits at the position opposed to the reading window 44, and reads the document D exposed in the reading path 48 during transport through the reading window 44. The document D placed on the glass plate 43 of the document bed 21 is read by the reading section 45 moving in the width direction X while being pressed with the document pressing face 47 of the document bed cover 23. The longitudinal direction of the reading section 45 is main scanning direction and the width direction X that is the moving direction of the reading section 45 is sub scanning direction.

At least one of the hinge mechanisms 41, 42 in the present embodiment is a hinge mechanism 40 having a below-mentioned height adjustment mechanism 90. Of the pair of hinge mechanisms 41, 42, at least one hinge mechanism 41 located on the side of the feeding mechanism 27 may be the hinge mechanism 40 having the height adjustment mechanism 90. In this case, both of the pair of hinge mechanisms 41, 42 may be the hinge mechanism 40 having the height adjustment mechanism 90, or only one hinge mechanism 41 located on the side of the feeding mechanism 27 may be the hinge mechanism 40 having the height adjustment mechanism 90. Only the other hinge mechanism 42 that is not located on the side of the feeding mechanism 27 may be the hinge mechanism 40 having the height adjustment mechanism 90.

Here, the reason why at least the hinge mechanism 41 located on the side of the feeding mechanism 27 is set as the hinge mechanism 40 having the height adjustment mechanism 90 is that the weight of the automatic document feeder 22 is biased toward the feeding mechanism 27. Since a larger load is exerted on the hinge mechanism 41 located on the side of the feeding mechanism, the height adjustment of the hinge mechanism 41 is required. A deviation between two positions in height of the document bed cover 23 supported by the hinge mechanisms 41, 42 causes a torsion of the document bed cover 23. Thus, when the document bed cover 23 is opened or closed, an excessive load due to the torsion may be exerted on the hinge mechanism 41. In addition, when the document bed cover 23 is closed, it may be difficult that the document pressing face 47 uniformly presses the entire document D on the document bed 21. For this reason, by adjusting the height of at least the portion of the document bed cover 23 on the side of the feeding mechanism 27 using the height adjustment mechanism 90, the document bed cover 23 supported by the pair of hinge mechanisms 41, 42 is assembled to the document bed 21 in parallel.

Figure 4:
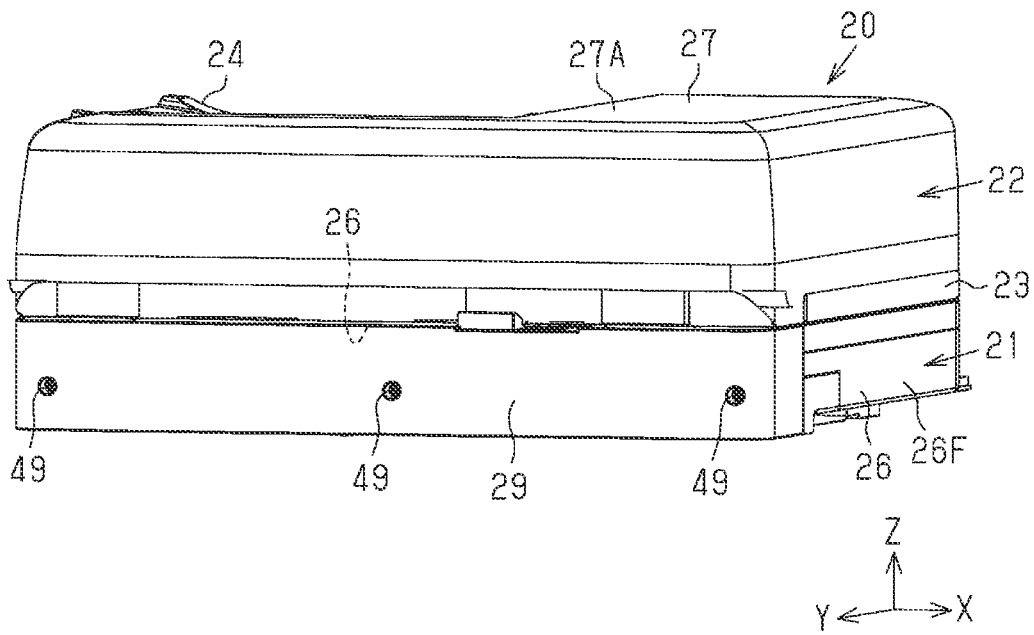
FIG. 4 is a perspective view illustrating the image reading apparatus when viewed from a back face.

As illustrated in FIG. 4, the housing 26 includes a front cover 26F that forms its front and both sides, and a rear cover 29 that forms its rear. The rear cover 29 that covers an opening 26C is fixed to the back face of the document bed 21. The rear cover 29 is fixed by fastening screws 49. In the state where the rear cover 29 is attached, heads of the screws 49 is exposed on the surface of the rear cover 29 with faced in the depth direction Y (back face-side). The operator can loosen the screws 49 to remove the rear cover 29. The rear cover 29 may be fixed by use of a locking arrangement such as snap-fit.

Figure 6:
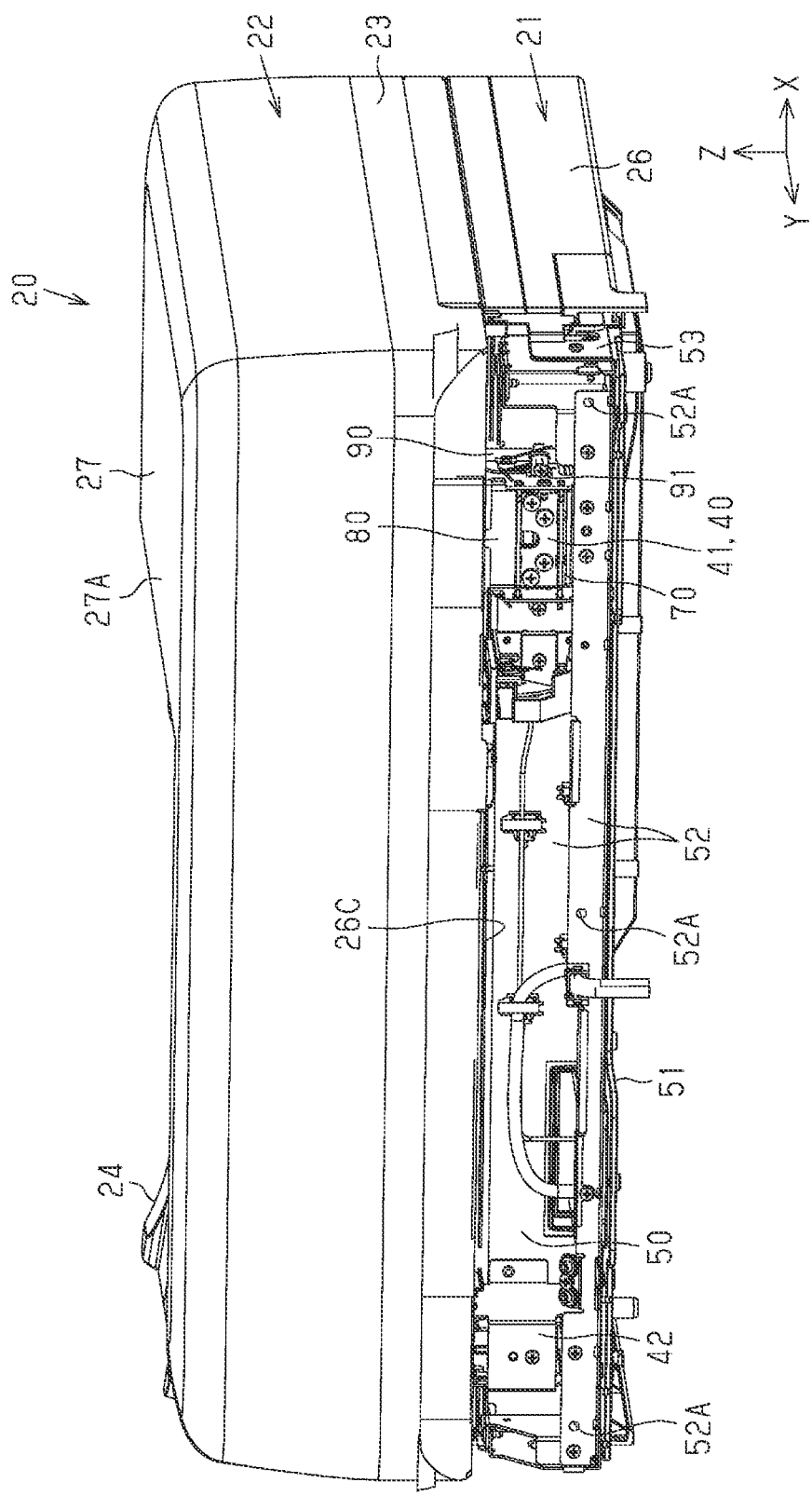
FIG. 6 is a perspective view illustrating the image reading apparatus with the rear cover removed when viewed from the back face.

FIG. 6 illustrates the state where the rear cover 29 is removed. As illustrated in FIG. 6, in the state where the rear cover 29 is removed, the structure on the back face-side in the housing 26 is exposed through the opening 26C. A part of a frame 50 constituting the housing 26, and a part of the hinge mechanisms 41, 42 are exposed through the opening 26C. The frame 50 has a bottom frame 51, a rear frame 52, a side frame 53, and a front frame (not illustrated), and is shaped like a closed-end square cylinder having an upwardly opened opening (not illustrated). The glass plate 43 (refer to FIG. 3) is assembled to the area corresponding to the opening of the frame 50.

The pair of hinge mechanisms 41, 42 are fixed to the rear frame 52 at their lower ends with screws (not illustrated) and to a support frame (not illustrated) constituting the document bed cover 23 at their upper ends with screws (not illustrated). Of the pair of hinge mechanisms 41, 42, the hinge mechanism 40 having the height adjustment mechanism 90 has a holding section 70 and a rotary fulcrum section 80 held by the holding section 70. The rotary fulcrum section 80 is fixed to the holding section 70 at a predetermined relative height. The holding section 70 is fixed to the rear frame 52 with a screw (not illustrated), and the rotary fulcrum section 80 is fixed to a support frame (not illustrated) constituting the document bed cover 23 with a screw (not illustrated). In the state where the rear cover 29 is removed, an adjustment section 91 of the height adjustment mechanism 90 is exposed through the opening 26C. The screws 49 fixing the rear cover 29 are fastened into a plurality of respective threaded holes 52A formed on the rear frame 52 at intervals in the width direction X.

Figure 5:
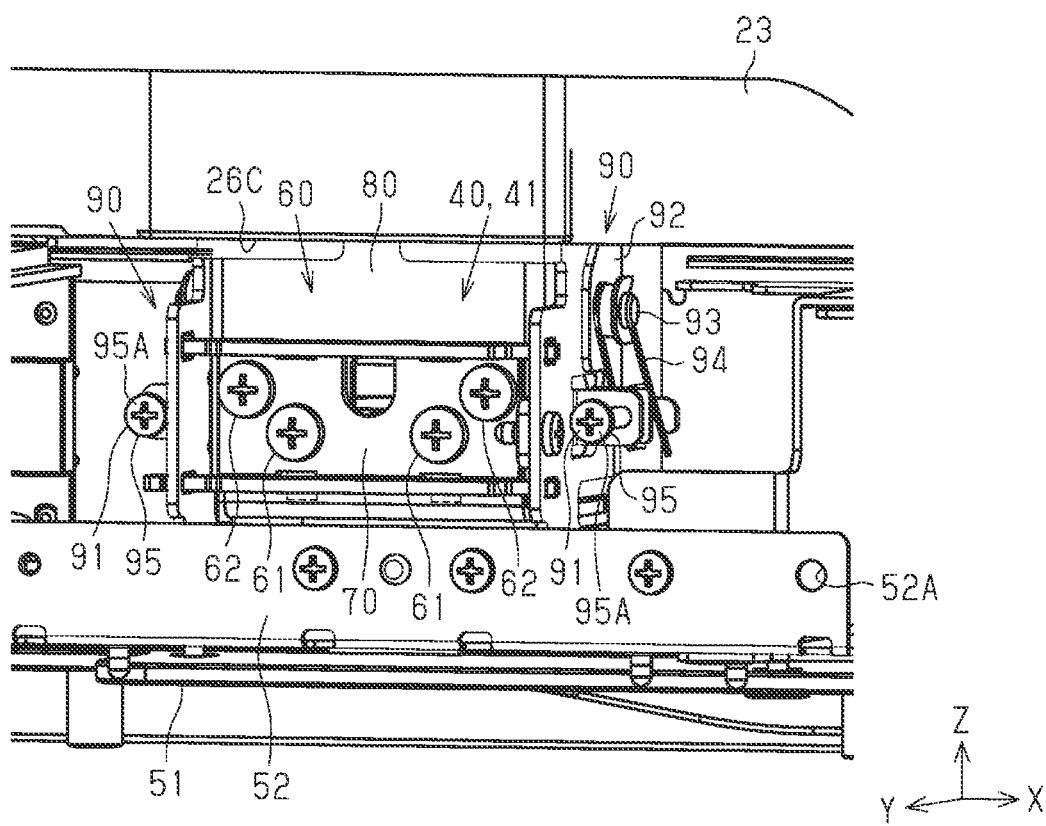
FIG. 5 is a perspective view illustrating a hinge mechanism exposed on the back face with a rear cover exposed.

As illustrated in FIG. 5, in the state where the rear cover 29 is removed, the adjustment section 91 of the height adjustment mechanism 90 of the hinge mechanism 40 is exposed through the opening 26C. Specifically, as illustrated in FIG. 5, an adjustment screw 95 constituting the adjustment section 91 is exposed with a screw head 95A faced the back face (depth direction Y). When the degree of flatness or the closing condition of the document bed cover 23 is worsened, the operator such as the user or serviceman operates the adjustment screw 95 exposed when the rear cover 29 is removed to adjust the height of the document bed cover 23 supported by the hinge mechanism 40 using a tool such as screwdriver. Specifically, the height of the document bed cover 23 fixed to the rotary fulcrum section 80 is adjusted by operating the adjustment screw 95 with the tool to adjust the height of the rotary fulcrum section 80 relative to the holding section 70. This height adjustment can adjust the degree of parallelization or the like of the document bed cover 23 with respect to the document bed 21. Since the holding section 70 and the rotary fulcrum section 80 are fixed at the predetermined relative height with screws 61, 62, the screws 61, 62 are loosened as necessary, enabling the rotary fulcrum section 80 to move relative to the holding section 70 in the Z axis direction and then, the adjustment screw 95 are operated.

Configuration of Hinge Mechanism

Figure 7:
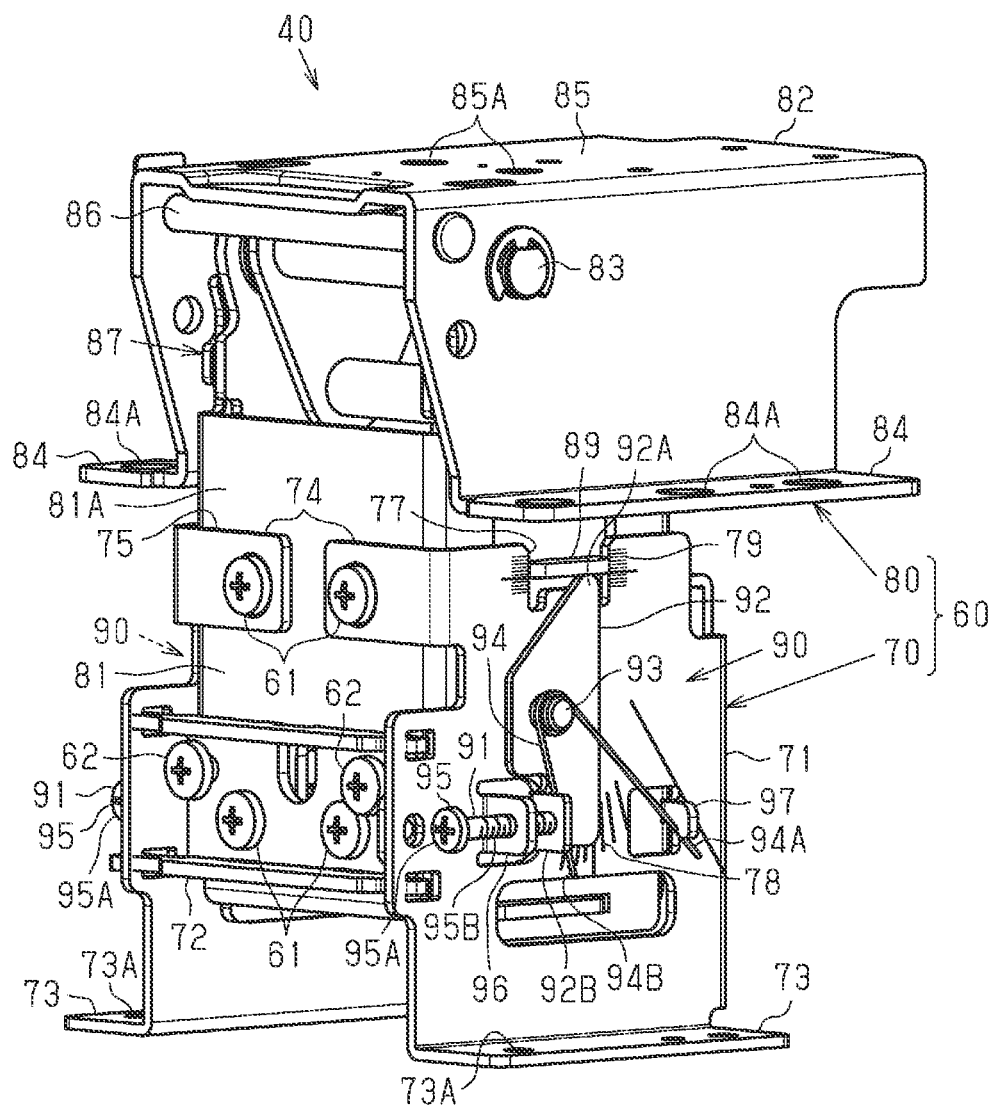
FIG. 7 is a perspective view illustrating the hinge mechanism.
Figure 8:
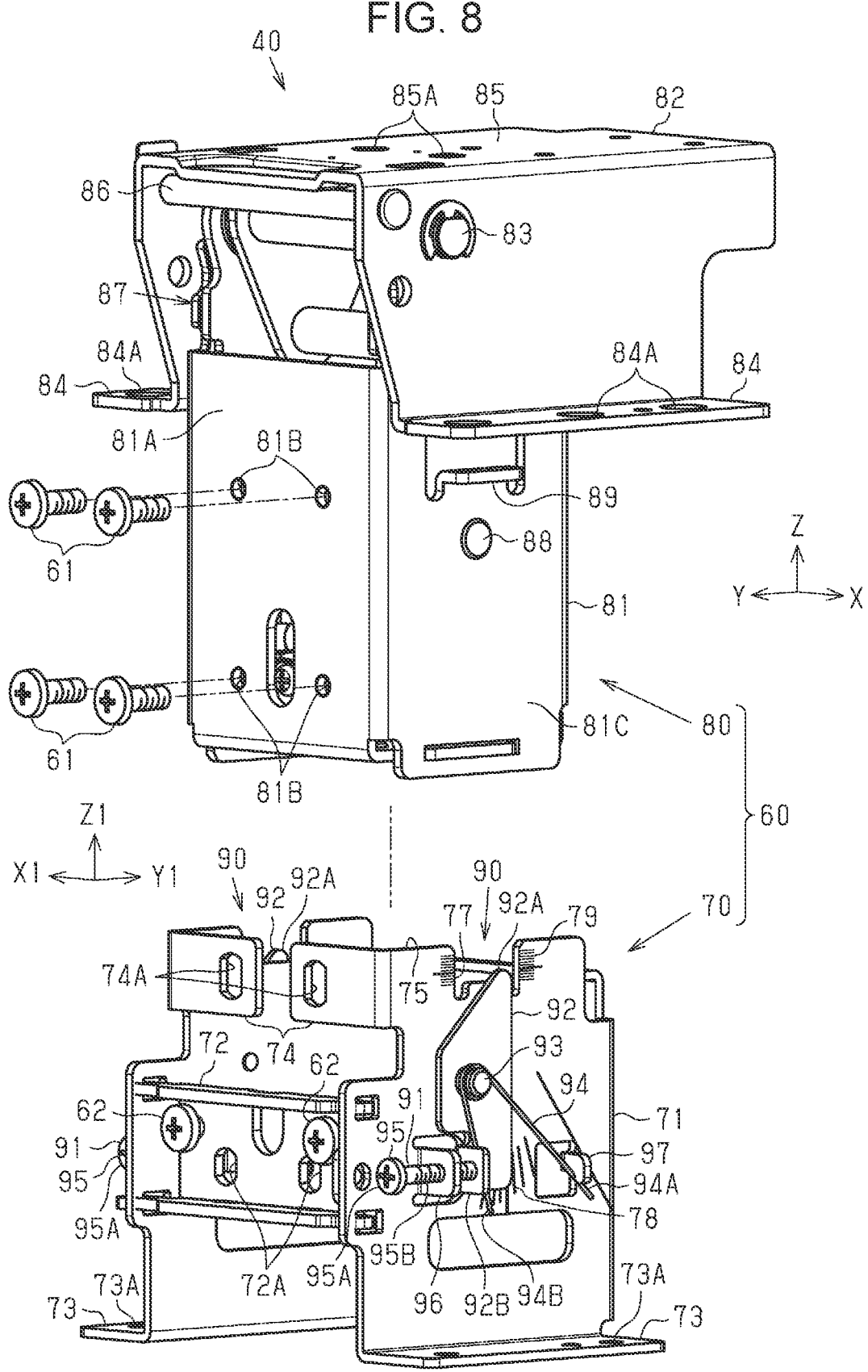
FIG. 8 is an exploded perspective view illustrating the hinge mechanism.

Next, referring to FIGS. 7, 8, and so on, detailed configuration of the hinge mechanism 40 having the height adjustment mechanism 90 will be described. Here, FIG. 7 illustrates an assembled state of the hinge mechanism 40, and FIG. 8 illustrates a disassembled state of the hinge mechanism 40. In FIGS. 7 to 11, a direction parallel to an axis of a shaft section 83, which is the rotary fulcrum of the hinge mechanism 40, is defined as an axial direction X1, a direction orthogonal to the axial direction X1 and in which the height of the rotary fulcrum section 80 is adjusted using the height adjustment mechanism 90 is defined as a height direction Z1, and a direction in which the adjustment screw 95 of the adjustment sections 91 is moved with a tool such as screwdriver is defined as an adjustment direction Y1. In FIGS. 7, 8, and so on, the adjustment direction Y1 is a direction in which the adjustment screw 95 is pushed. In the state where the hinge mechanism 40 is assembled to the document bed 21 and the document bed cover 23, the axial direction X1 is parallel to the width direction X, the height direction Z1 is parallel to the vertical direction Z, and the adjustment direction Y1 is parallel to the depth direction Y.

The hinge mechanism 40 provided at one end of the document bed 21 includes a rotational supporting section 60 rotatably supports the automatic document feeder 22 with respect to the document bed 21, and the height adjustment mechanism 90 that adjusts the height of the automatic document feeder 22 relative to the document bed 21. The rotational supporting section 60 includes the holding section 70 fixed to the document bed 21, and the rotary fulcrum section 80 that is attached to the holding section 70 and is vertically movable with respect to the holding section 70. The height adjustment mechanism 90 adjusts the height of the rotary fulcrum section 80 relative to the holding section 70, thereby adjusting the height of the automatic document feeder 22 relative to the document bed 21. The height adjustment mechanism 90 moves the holding section 70 relative to the rotary fulcrum section 80.

As illustrated in FIG. 7, the hinge mechanism 40 includes the substantially square cylindrical holding section 70 fixed to the housing 26, and the rotary fulcrum section 80 inserted into the cylinder of the holding section 70 and assembled thereto.

The holding section 70 includes holding section body 71 formed by bending a predetermined shape of plate member into a predetermined shape including at least three planes of a square cylinder. When the holding section body 71 is viewed in plan view, of four planes forming the square cylinder, one plane other than substantially U-shaped three planes is almost opened. A substantially rectangular horizontal member 72 is fixed to this opened portion to form a cylindrical shape. The holding section 70 has a pair of extension sections 74 that extend to be closer to each other above the horizontal member 72. The holding section 70 has a guide hole 75 that forms the square cylinder.

A pair of attachment sections 73 that horizontally extends to be away from each other are formed at a lower end of the holding section body 71. The attachment sections 73 has screw insertion holes 73A into which respective screws (not illustrated) for fixing the holding section 70 of the hinge mechanism 40 to the rear frame 52 are inserted.

The horizontal member 72 has a pair of long holes 72A having a longitudinal direction as the height direction Z1 (refer to FIG. 8). The two screws 61 are inserted into the pair of long holes 72A. The pair of extension sections 74 has a pair of long holes 74A having a longitudinal direction as the height direction Z1 (refer to FIG. 8). The two screws 61 are inserted into the pair of long holes 74A.

The rotary fulcrum section 80 has a square cylindrical sliding section 81 and a rotation frame 82 rotatably coupled to an upper end of the sliding section 81. The outer dimension of the square cylindrical sliding section 81 is almost equal to the inner dimension of the guide hole 75. That is, the square cylindrical sliding section 81 and the guide hole 75 are each formed such that the sliding section 81 can be inserted into the guide hole 75. The sliding section 81 is inserted into the guide hole 75, resulting in that the rotary fulcrum section 80 is coupled to the holding section 70 to be slidable in the vertical direction Z.

Four threaded holes 81B are formed in a side face 81A of the sliding section 81 of the rotary fulcrum section 80 at the positions corresponding to the four long holes 72A, 74A of the holding section 70. The four screws 61 inserted into the long holes 72A, 74A are screwed into the respective threaded holes 81B of the sliding section 81, resulting in that the rotary fulcrum section 80 is fixed to the holding section 70 at the predetermined relative height.

As illustrated in FIG. 8, the sliding section 81 is shaped like a square cylinder formed by bending a plate-like frame. The rotation frame 82 is rotatably coupled to the un upper end of the sliding section 81 via the shaft section 83. The rotation frame 82 has a substantially Ω-shaped cross section when viewed from the Y direction, and further extends toward the adjustment direction Y1 than the shaft section 83 that is the rotational center. The rotation frame 82 has a pair of attachment sections 84 that extend from its lower end to both sides in the axial direction X1, and an attachment face 85 formed of an upper face of the rotation frame 82. The pair of attachment sections 84 have a plurality of screw insertion holes 84A. A plurality of threaded holes 85A is formed in the attachment face 85. A rear end of the automatic document feeder 22 is fixed to the pair of attachment sections 84 with screws (not illustrated) inserted into the screw insertion holes 84A. The support frame (not illustrated) constituting a part of the framework of the automatic document feeder 22 is fixed to the attachment face 85 with screws (not illustrated) screwed into the threaded holes 85A.

The rotation frame 82 is biased toward the sliding section 81 to open the document bed cover 23 due to a biasing force of a spring not illustrated. A shaft-like stopper 86 is fixed to an upper portion of a rear end of the rotation frame 82. The degree of opening of the rotation frame 82 is set to an extent that the stopper 86 abuts the side face 81A of the sliding section 81. A lift mechanism 87 is assembled to the rotary fulcrum section 80. The lift mechanism 87 is supported on the sliding section 81 so as to move (lift) the rotation frame 82 in the vertical direction Z while keeping the document bed cover 23 horizontal when the thick document D such as book or magazine is placed on the document bed 21. A rear end of the rotation frame 82 is drawn (downward) into the sliding section 81 by a spring (not illustrated) constituting the lift mechanism 87.

As illustrated in FIG. 8, a pair of protrusions 88 (only one is illustrated in FIG. 8) are protrudingly provided on a pair of opposed side faces 81C of the sliding section 81 in the axial direction X1. The pair of protrusions 88 have the function of suppressing a backlash of the sliding section 81 inserted into the guide hole 75 of the holding section 70 in the axial direction X1. Further, a pair of plate-like supported sections 89 (only one is illustrated in FIGS. 7 and 8) extend outward from the side faces 81C of the sliding section 81 above the pair of protrusions 88. The pair of supported sections 89 constitute a part of the below-mentioned height adjustment mechanism 90.

In the state where the height of the rotary fulcrum section 80 relative to the holding section 70 is adjusted by the height adjustment mechanism 90, the four screws 61 inserted into the long holes 72A, 74A are screwed into the threaded holes 81B. Thereby, the rotary fulcrum section 80 is fixed to the holding section 70 at the predetermined relative height. The shaft portions of the two screws 62 screwed into the threaded holes (not illustrated) of the horizontal member 72 press the side face 81A of the sliding section 81 to define the sliding section 81 in the guide hole 75 in the depth direction Y.

Configuration of Height Adjustment Mechanism

Next, the configuration of the height adjustment mechanism 90 will be described. As illustrated in FIG. 7, the height adjustment mechanism 90 is provided at one side of the holding section 70. The height adjustment mechanism 90 has the function of adjusting the height of the rotary fulcrum section 80 relative to the holding section 70.

Figure 9:
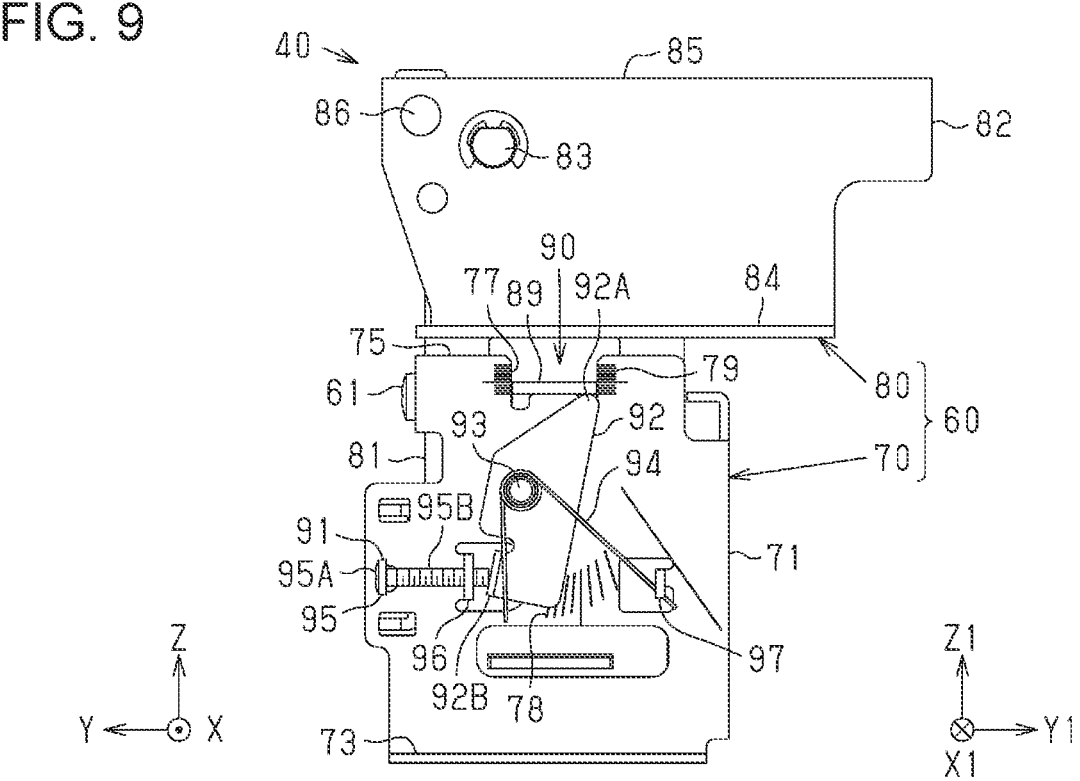
FIG. 9 is a side view illustrating the hinge mechanism adjusted to a lowest position in height.

As illustrated in FIG. 7, the height adjustment mechanism 90 includes the above-mentioned adjustment section 91, a rotator 92 that can rotate with respect to the holding section 70, a shaft section 93 that is a rotary fulcrum for the rotator 92, and a supporting section 92A that supports a rotary fulcrum section 80. The adjustment section 91 is provided to be movable in the adjustment direction Y1 orthogonal to the axial direction X1 in which the shaft section 93 as the rotary fulcrum extends. The adjustment section 91 contacts the rotator 92 in the direction orthogonal to the axial direction X1 to change the rotation amount of the rotator 92. In this example, the rotator 92 has the supporting section 92A that supports the rotary fulcrum section 80. The operator moves the adjustment sections 91, thereby changing the rotation amount of the rotator 92 and adjusting the height of the supporting section 92A. As illustrated in FIG. 9, when viewed from the axial direction X1, the shaft section 93 is provided closer to the back face-side than the center of the supported sections 89 in the depth direction Y.

As illustrated in FIG. 7, the adjustment section 91 in this example is the adjustment screw 95 held in the state where the screw head 95A oriented to one end. The adjustment screw 95 has the screw head 95A and a shaft section 95B having a screw portion on its outer circumference. The adjustment screw 95 is held in the state where the screw head 95A faces the back face-side (depth direction Y) and the shaft section 95B is screwed into a screw holding section 96 protruding from a side face of the holding section 70.

As illustrated in FIG. 7, the rotary fulcrum section 80 has the above-mentioned supported sections 89 supported by the supporting section 92A. The supported sections 89 horizontally protrudes from the side face of the sliding section 81. The supported sections 89 is plate-shaped.

The holding section 70 has a notches 77 that can hold the supported sections 89. The dimension of the notches 77 in the adjustment direction Y1 is somewhat larger than the dimension of the supported sections 89 in the adjustment direction Y1. The supported sections 89 are held by the notches 77, thereby defining the sliding section 81 with respect to the holding section 70 in the depth direction Y. The supported sections 89 are held by the notches 77, resulting in that the automatic document feeder 22 is positioned with respect to the document bed 21 in the depth direction Y.

As illustrated in FIG. 7, the hinge mechanism 40 includes a torsion coil spring 94, which is an example of a biasing member attached between the rotator 92 and the holding section 70. The torsion coil spring 94 applies a biasing force to rotate the rotator 92 in a first direction. The first direction in which the torsion coil spring 94 biases the rotator 92 is the clockwise direction in FIG. 9. The torsion coil spring 94 is latched on a latch section 97 of the holding section 70 at one end 94A, and is latched on the abutted section 92B of the rotator 92 at the other end 94B. The rotator 92 is biased to abut the adjustment section 91 at all times by the torsion coil spring 94, and the adjustment section 91 receives the biasing force of the torsion coil spring 94 via the adjustment section 91. Thus, to adjustment the height, the adjustment section 91 moves in the adjustment direction Y1 while resisting the biasing force of the torsion coil spring 94, and moves in the opposite direction to the adjustment direction Y1 (−Y1-side) while receiving the biasing force of the torsion coil spring 94. In this manner, the adjustment section 91 adjust the height while moving in the adjustment direction Y1 orthogonal to the axial direction X1 or the opposite direction to the adjustment direction Y1 (−Y1-side) to prohibit rotation of the rotator 92 in the first direction.

As illustrated in FIG. 7, the adjustment section 91 is the adjustment screw 95 with the screw head 95A oriented to one end. The rotator 92 has an abutted section 92B at its lower end on the opposite side to the supporting section 92A at its upper end across the shaft section 93, and a tip of the shaft section 95B of the adjustment screw 95 can abut the abutted section 92B. The tip of the shaft section 95B abuts the abutted section 92B, allowing the adjustment screw 95 to prohibit rotation of the rotator 92 in the first direction by the torsion coil spring 94. For example, the rotary fulcrum section 80, at an intermediate position illustrated in FIG. 10, pushes the adjustment screw 95 in the adjustment direction Y1 (+Y1-side). Then, the rotator 92 rotates in a second direction in which the rotary fulcrum section 80 moves toward a highest position illustrated in FIG. 11, against the first direction that is the biasing direction of the torsion coil spring 94. Here, the second direction is opposite to the first direction and corresponds to the counterclockwise direction in FIG. 11. For example, the rotary fulcrum section 80, at the intermediate position illustrated in FIG. 10, pulls back the adjustment screw 95 in the opposite direction to the adjustment direction Y1 (−Y1-side). Then, the rotator 92 rotates in the first direction due to the biasing force of the torsion coil spring 94 while the abutted section 92B abuts the shaft section 95B of the adjustment screw 95.

Figure 11:
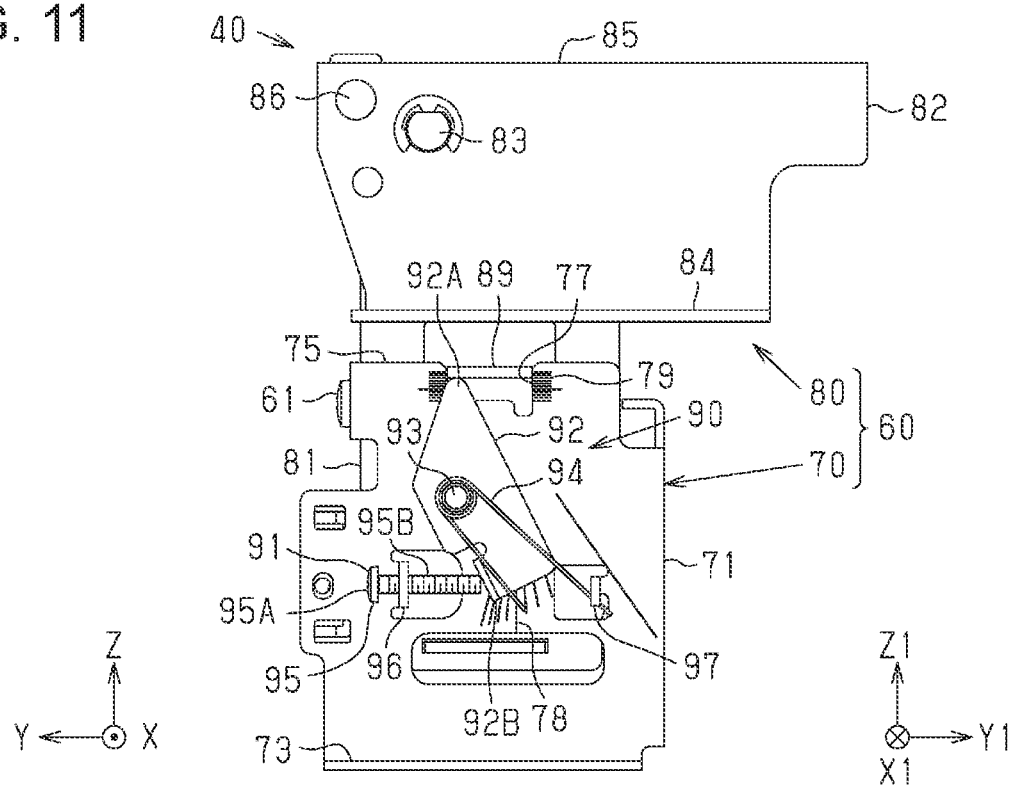
FIG. 11 is a side view illustrating the hinge mechanism adjusted to a highest position in height.

As illustrated in FIG. 11, the height adjustment mechanism 90 is configured such that the state where the adjustment screw 95 is pushed most in the adjustment direction Y1 (+Y1-side) becomes the state where the rotary fulcrum section 80 is located at the highest position. In other words, as the adjustment screw 95 is pushed in the adjustment direction Y1 (+Y1-side), the position of the rotary fulcrum section 80 becomes higher, and as the adjustment screw 95 is pulled back in the opposite direction (−Y1-side) to adjustment direction Y1, the position of the rotary fulcrum section 80 becomes lower. Thereby, in adjusting the height of the rotary fulcrum section 80, by moving the adjustment screw 95 in the adjustment direction Y1 or the opposite direction (−Y1-side), the position of the rotary fulcrum section 80 can be made higher or lower, easily adjusting the height.

As illustrated in FIG. 7, the height adjustment mechanism 90 overlaps the holding section 70 and the rotary fulcrum section 80 in the vertical direction Z. Hereinafter, this will be referred to as overlap condition. Here, the range of the height adjustment mechanism 90 in the vertical direction Z is the extend from the upper face of the supported section 89 to the lower end of the torsion coil spring 94 in the vertical direction Z. Specifically, the height adjustment mechanism 90 is constituted of the members assembled to the holding section 70 including the rotator 92, the shaft section 93, the torsion coil spring 94, the adjustment screw 95 constituting the adjustment section 91; and members of the holding section 70 including the screw holding section 96, the latch section 97, and the supported sections 89 of the rotary fulcrum section 80. Among these members, the supported section 89 is located at the highest point and the lower end of the torsion coil spring 94 is located at the lowest point in the vertical direction Z. Thus, the range from the upper face of the supported sections 89 to the lower end of the torsion coil spring 94 is the range where the height adjustment mechanism 90 is present in the vertical direction Z. Although this range varies depending on the height adjustment of the rotary fulcrum section 80 with respect to the holding section 70, the above-mentioned overlap condition needs to be satisfied at least once in the range from the lowest position (FIG. 9) to the highest position (FIG. 11) in the height of the rotary fulcrum section 80 relative to the holding section 70. In the present embodiment, even when the height of the rotary fulcrum section 80 relative to the holding section 70 varies in the range from the lowest position (FIG. 9) to the highest position (FIG. 11), the above described overlap condition is always satisfied in the range of the height adjustment mechanism 90 in the vertical direction Z.

That is, when the height of the rotary fulcrum section 80 relative to the holding section 70 varies from the lowest position to the highest position, the lower end of the supported section 89 is located below (−z-side) the upper end of the holding section 70, and the lower end of the torsion coil spring 94 is located above (+z-side) the lower end of the holding section 70 at all times. In other words, the entire height adjustment mechanism 90 overlaps the holding section 70 in the vertical direction Z at all times.

Figure 10:
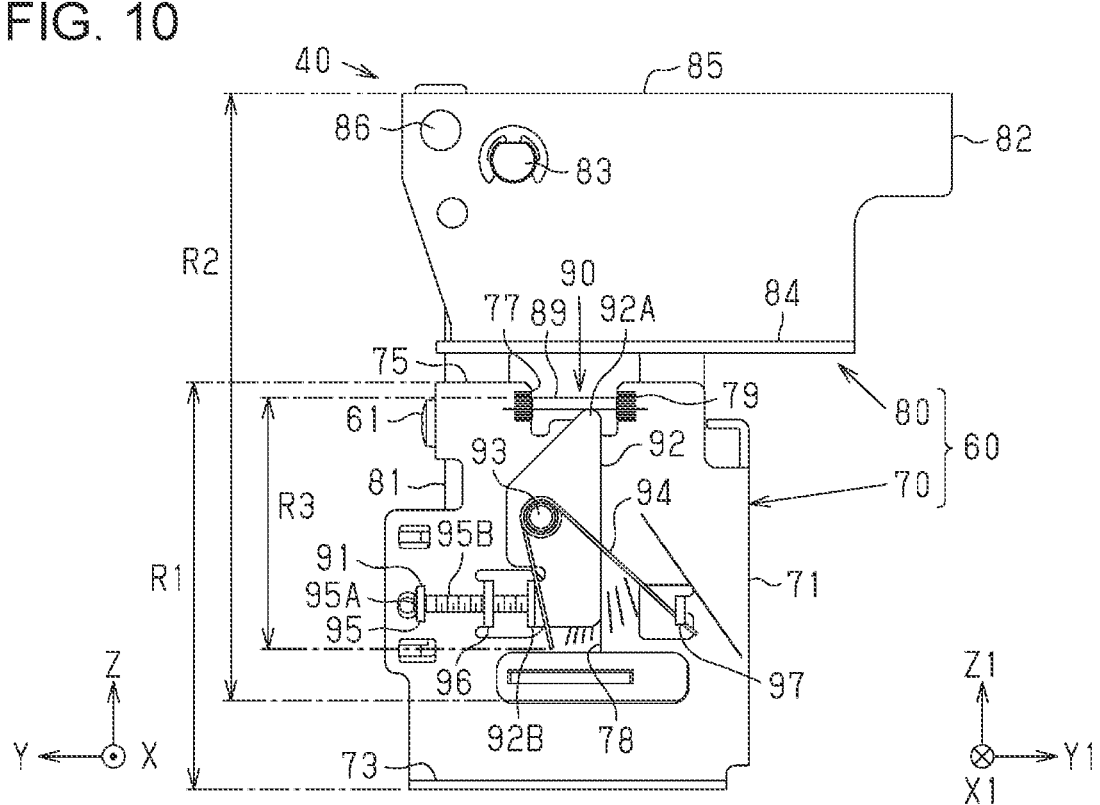
FIG. 10 is a side view illustrating the hinge mechanism adjusted to an intermediate position in height.

Since the supported section 89 is a part of the rotary fulcrum section 80, irrespective of the relative height of the rotary fulcrum section 80, the supported section 89 overlaps the rotary fulcrum section 80 at all times in the vertical direction Z. The lower end of the torsion coil spring 94 is located above (+z-side) the lower end of the rotary fulcrum section 80 at all times. For this reason, in the present embodiment, the entire height adjustment mechanism 90 overlaps the rotary fulcrum section 80 in the vertical direction Z at all times. As described above, in the hinge mechanism 40 in the present embodiment, the entire height adjustment mechanism 90 overlaps both the holding section 70 and the rotary fulcrum section 80 in the vertical direction Z at all times. For example, as illustrated in FIG. 10, when the rotary fulcrum section 80 is located at the intermediate position, in the vertical direction Z, a range R3 of the height adjustment mechanism 90 overlaps a range R1 of the holding section 70 and a range R2 of the rotary fulcrum section 80. This overlap condition is satisfied in FIGS. 9 and 11.

Actions of Embodiment

Actions of the present embodiment will be described below.

In assembling the multifunctional printer 11 in a factory, the housing 26 of the image reading apparatus 20 are assembled to an upper frame (not illustrated) of the body 12 by fastening a plurality of bolts or screws. Next, the pair of hinge mechanisms 41, 42 are assembled to the back (back face-side) of the document bed 21 on both sides in the width direction X. The hinge mechanisms 41, 42 each have the holding section 70 and the rotary fulcrum section 80. The attachment sections 73 of the holding section 70 is fixed to the rear frame 52 of the housing 26 with a screw (not illustrated). In the present embodiment, at least one of the pair of hinge mechanisms 41, 42 is the hinge mechanism 40 having the height adjustment mechanism 90.

When the assembling of the pair of hinge mechanisms 41, 42 to the document bed 21 is completed, the adjustment screw 95 is operated by using a tool such as screwdriver, the rotator 92 is adjusted to a rotational angle corresponding to, for example, the intermediate position. At this time, the rotational angle of the rotator 92 is adjusted by aligning the line of the side edge of the rotator 92 with a rotational scale 78. The rotational angle of the rotator 92 corresponds to the rotation amount with respect to a reference angle of the rotator 92. The reference angle is, for example, a rotational angle in the state where the rotary fulcrum section 80 is located at the lowest position.

After that, a support frame (not illustrated) constituting the document bed cover 23 is fixed to the rotation frame 82 constituting the rotary fulcrum section 80 of the hinge mechanisms 41, 42 with screws. The document bed cover 23 that mounts the automatic document feeder 22 is fixed to the hinge mechanisms 41, 42 in this manner and then, the height of the document bed cover 23 supported by the hinge mechanism 40 is adjusted using the height adjustment mechanism 90. The operator operates the adjustment screw 95 of the height adjustment mechanism 90 by use of a tool to rotate the rotator 92 from the initial rotational angle, thereby adjusting the height of the rotary fulcrum section 80 relative to the holding section 70. Details of the height adjustment operation of the rotary fulcrum section 80 will be described later.

When the height adjustment of the document bed cover 23 is completed, the front cover 26F and the rear cover 29 are fixed to the document bed 21 with the screws 49 or the like. The multifunctional printer 11 thus manufactured is shipped.

For the assembling method of the hinge mechanism 40, as long as the document bed cover 23 can be rotatably assembled to the document bed 21, any assembling procedure can be appropriately selected. For example, the hinge mechanism 40 may be attached to the document bed cover 23 and then, the holding section 70 of the hinge mechanism 40 may be fixed to the rear frame 52. The document bed cover 23 is fixed to the rotation frame 82 of the rotary fulcrum section 80, and the holding section 70 is fixed to the rear frame 52. Then, the sliding section 81 of the rotary fulcrum section 80 is inserted into the holding section 70 and then, the height of the rotary fulcrum section 80 relative to the holding section 70 is adjusted by the height adjustment mechanism 90. According to such appropriate procedure, the hinge mechanism 40 may be assembled to the image reading apparatus 20.

The multifunctional printer 11 thus shipped is used by the user. Before or after the use of the multifunctional printer 11, it may be demanded to adjust the height of the document bed cover 23 supported by the hinge mechanism 40 for maintenance. In this case, the operator such as the user operates the height adjustment mechanism 90 of the hinge mechanism 40 to adjust the height of the supported document bed cover 23 for maintenance.

This maintenance is performed as follows. The operator removes the rear cover 29 from the document bed 21 of the image reading apparatus 20. Specifically, the operator fastens the screws 49 a screw head of which is exposed from the rear cover 29 that covers the back face of the document bed 21 by use of a tool such as screwdriver, thereby removing the rear cover 29. When the rear cover 29 is removed, as illustrated in FIGS. 5 and 6, the adjustment section 91 of the hinge mechanism 40 is exposed. The operator operates the adjustment screw 95 exposed from the opening 26C of the back face of the document bed 21 using a tool to adjust the height of the document bed cover 23 supported by the hinge mechanism 40.

Height Adjustment Method Using Height Adjustment Mechanism

Next, the method of adjusting the height of the hinge mechanism 40 using the height adjustment mechanism 90 will be described.

In performing the height adjustment operation using the height adjustment mechanism 90, both in manufacturing and maintenance of the multifunctional printer 11 (especially, the image reading apparatus 20), the adjustment section 91 is exposed. For example, in assembling the image reading apparatus 20 in the factory, the height adjustment operation is performed before attachment of the rear cover 29. On the other hand, when the operator such as the user performs the height adjustment operation of the multifunctional printer 11 for maintenance, the operator loosens the screws 49 with a tool to remove the rear cover 29. This exposes the adjustment screw 95.

During manufacturing of the image reading apparatus 20, the adjustment screw 95 is located at an initial position. Fr convenience of description, the initial position of the adjustment screw 95 is assumed to be located at a second operational position corresponding to the intermediate position. When the operator such as the user adjusts the height of the hinge mechanism 40 for maintenance or the like, the height of the rotary fulcrum section 80 relative to the holding section 70 is located at a height at shipping, or a height adjusted at previous maintenance. Here, for convenience of description, the position of the adjustment screw 95 is assumed to be located at the second operational position corresponding to the intermediate position. When the height adjustment operation is performed using the adjustment screw 95, the four screws 61 are detached and the two screws 62 are loosened.

When the adjustment screw 95 is located at the second operational position, the rotator 92 is located at the rotational angle illustrated in FIG. 10. The operator operates the adjustment screw 95 by use of a tool to perform the height adjustment operation of the rotary fulcrum section 80 by the height adjustment mechanism 90. For example, when the rotary fulcrum section 80 is raised from the intermediate position illustrated in FIG. 10, the operator rotates the adjustment screw 95 in a pushing direction (+Y1 direction). Thereby, the shaft section 95B of the pushed adjustment screw 95 pushes the abutted section 92B of the rotator 92, thereby rotating the rotator 92 about the shaft section 93 in the second direction in FIG. 10 (counterclockwise direction in FIG. 10). Due to the rotator 92 in the second direction, the supporting section 92A of the rotator 92 is displaced upward. The supporting section 92A pushes the supported sections 89 upward. As a result, the rotary fulcrum section 80 is displaced upward with respect to the holding section 70.

Accordingly, the rotary fulcrum section 80 is adjusted with respect to the holding section 70 to be higher than the intermediate position. At this time, the adjustment amount of the height of the rotary fulcrum section 80 relative to the holding section 70 is adjusted by the operation amount of the adjustment screw 95. At this time, the operator adjusts the height of the supported sections 89 while viewing a height scale 79.

Inversely, when the rotary fulcrum section 80 is lowered to the position below the intermediate position, the operator rotates the adjustment screw 95 in the pulling direction (−Y1 direction). As a result, the shaft section 95B of the adjustment screw 95 is pulled back, such that the rotator 92 rotates about the shaft section 93 in the first direction (clockwise direction in FIG. 10) due to the biasing force of the torsion coil spring 94. Due to this rotation of the rotator 92 in the first direction, the supporting section 92A is displaced downward. As a result, the supported sections 89 lowers along with the supporting section 92A. Thereby, the rotary fulcrum section 80 displaces downward with respect to the holding section 70. Thus, the rotary fulcrum section 80 is adjusted relative to the holding section 70 to be located below the intermediate position. At this time, the adjustment amount of the height of the rotary fulcrum section 80 relative to the holding section 70 is adjusted by the operation amount of the adjustment screw 95. At this time, the operator adjusts the height of the supported section 89 while viewing the height scale 79.

By adjusting the height of the rotary fulcrum section 80 relative to the holding section 70 in this manner, the height of the document bed cover 23 and the automatic document feeder 22 that are supported by the hinge mechanism 40 is adjusted. That is, the height of the document bed cover 23 relative to the document bed 21 is adjusted. When the height of the rotary fulcrum section 80 relative to the holding section 70 is determined, the two screws 62 are fastened to position the sliding section 81 at the height. Further, the four screws 61 are inserted into the long holes 72A, 74A of the holding section 70 and screwed into the threaded holes 81B of the sliding section 81. In this manner, the rotary fulcrum section 80 is fixed to the holding section 70 at the adjusted relative height. As a result, the degree of parallelization and the closing condition of the document bed cover 23 with respect to the document bed 21 are adjusted.

In manufacturing of the image reading apparatus 20, then, subsequent manufacturing steps are performed. In maintenance, when the height adjustment of the document bed cover 23 is completed, the rear cover 29 is attached to cover the opening 26C. Then, the screws 49 are fastened by use of a tool to fix the rear cover 29 to the rear frame 52. In this manner, the adjustment of the degree of parallelization of the document bed cover 23 with respect to the document bed 21 and the adjustment of the closing condition can be simply achieved merely by performing the opening/closing operation of the rear cover 29 and the operation of the screws 61, 62 and the adjustment screw 95.

The height adjustment mechanism 90 overlaps the holding section 70 and the rotary fulcrum section 80 in the vertical direction Z. For this reason, even if the height adjustment mechanism 90 is provided, the hinge mechanism 40 hardly becomes large in the vertical direction. Hence, the image reading apparatus 20 hardly becomes large in the vertical direction Z.

Effects of the present embodiment will be described below.

(1) The image reading apparatus 20 includes the document bed 21 on which the document D is placed, and the automatic document feeder 22 that is an example of the opening/closing member configured to be opened/closed with respect to the document bed 21. The image reading apparatus 20 further includes the rotational supporting section 60 that is provided at one end of the document bed 21 and rotatably supports the automatic document feeder 22 with respect to the document bed 21, and the height adjustment mechanism 90 that adjusts the height of the automatic document feeder 22 relative to the document bed 21. The rotational supporting section 60 has the holding section 70 fixed to the document bed 21, and the rotary fulcrum section 80 attached to the holding section 70 and being movable in the up-down direction relative to the holding section 70. The height adjustment mechanism 90 adjusts the height of the rotary fulcrum section 80 relative to the holding section 70 to adjust the height of the automatic document feeder 22 relative to the document bed 21. The height adjustment mechanism 90 overlaps the holding section 70 and the rotary fulcrum section 80 in the vertical direction Z. With this configuration, the height of the hinge mechanism 40 is adjusted while suppressing an increase in the size of the image reading apparatus 20.

(2) The height adjustment mechanism 90 moves the rotary fulcrum section 80 relative to the holding section 70. With this configuration, since the height adjustment mechanism 90 is configured to move the rotary fulcrum section 80 relative to the holding section 70, the portion of the height adjustment mechanism 90, which is located below the holding section 70, can be further reduced or eliminated. Hence, an increase in the size of the portion configured of the holding section 70, the rotary fulcrum section 80, and the height adjustment mechanism 90 in the height direction can be further suppressed.

(3) The height adjustment mechanism 90 includes the rotator 92 that can rotate with respect to the holding section 70, the shaft section 93 that is the rotary fulcrum of the rotator 92, and the adjustment section 91 that changes the rotation amount of the rotator 92. The adjustment section 91 is movable in the direction (adjustment direction Y1) orthogonal to the direction (axial direction X1) in which the axis of the shaft section 93 extends, and makes contact with the rotator 92 in the orthogonal direction to change the rotation amount of the rotator 92. The rotator 92 has the supporting section 92A that supports the rotary fulcrum section 80. The adjustment section 91 is moved to change the rotation amount and the height of the supporting section 92A is adjusted. With this configuration, the height of the rotational supporting section 60 is rotationally adjusted by the adjustment operation of moving the adjustment section 91 to rotate the rotator 92, enabling downsizing and fine adjustment. For example, in the configuration in which the height of the rotary fulcrum section 80 is adjusted using the conversion mechanism for converting horizontal displacement into heightwise displacement, when it is attempted to make fine adjustment by decreasing the amount of horizontal displacement relative to the amount of heightwise displacement, for example, the inclination of the inclined face of a horizontally displaced member needs to be small. When the inclination of the inclined face is small, this member is likely to become large in the horizontal direction. On the contrary, the configuration in which displacement of the adjustment section 91 is converted into heightwise displacement by the rotation of the rotator 92 enables fine displacement of the rotary fulcrum section 80 in the height direction.

(4) The rotary fulcrum section 80 has the supported sections 89 supported by the supporting section 92A. The holding section 70 has the notches 77 that can hold the supported sections 89. The supported sections 89 are held by the notches 77 to position the automatic document feeder 22 with respect to the document bed 21. With this configuration, the notches 77 can hold the supported sections 89 to achieve positioning in the predetermined direction (Y axis direction).

(5) The image reading apparatus 20 includes the torsion coil spring 94 that is attached between the rotator 92 and the holding section 70 and applies the biasing force to the rotator 92 so as to rotate in the first direction. The adjustment section 91 prevents the rotator 92 from rotating in the first direction while moving in the orthogonal direction (adjustment direction Y1) to adjust the height. With this configuration, since the rotator 92 is biased, positioning can be achieved in the state where the rotator 92 abuts the adjustment section 91 such as screw at all time, facilitating adjustment.

(6) The adjustment section 91 is the adjustment screw 95 with the screw head 95A oriented to the one end. With this configuration, since the screw head 95A is accessible from the back face-side of the apparatus, height adjustment is facilitated.

The embodiment can be changed to forms as in modification examples described above below. Further, the embodiment and the below-mentioned modification examples can be appropriately combined with each other to bring about a further modification example, and the below-mentioned modification examples can be appropriately combined with each other to bring about a further modification example.

Figure 12:
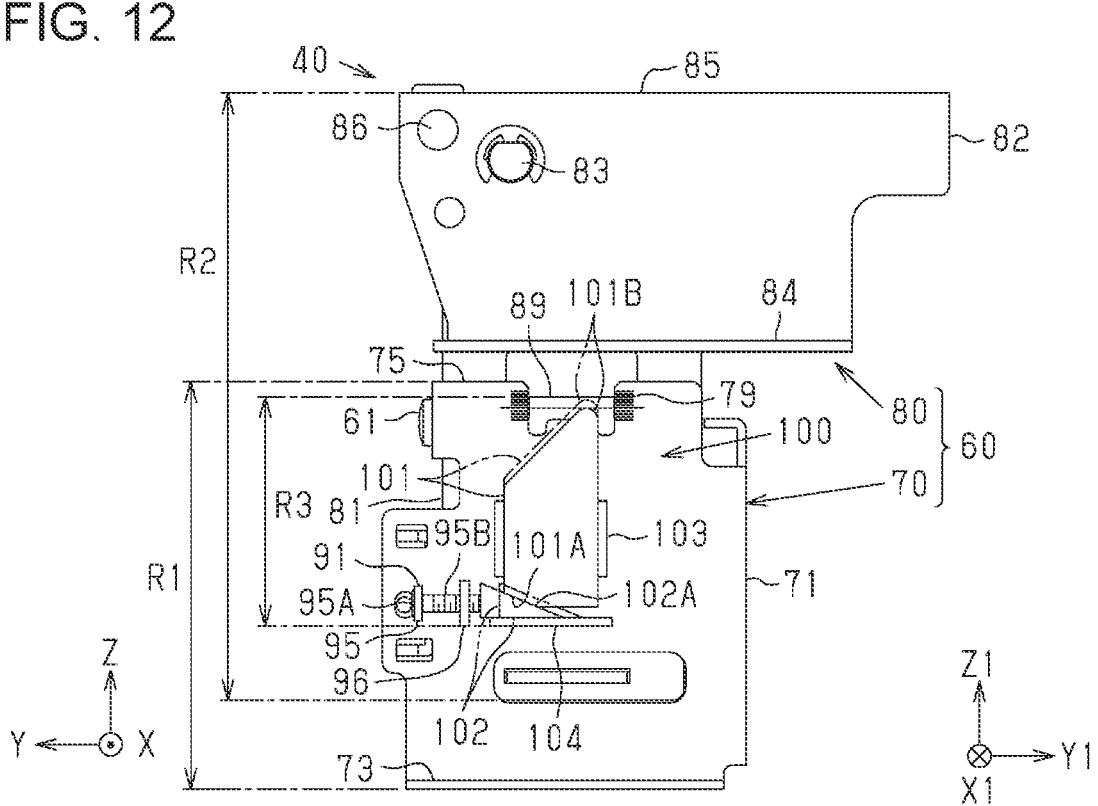
FIG. 12 is a side view illustrating a hinge mechanism in a modification example.

The height adjustment mechanism is not limited to the rotational height adjustment mechanism 90 that rotates a rotator such as the rotator 92. That is, the configuration is not limited to the configuration using the rotational mechanism that converts rotational displacement of the rotator into displacement in the height direction Z1. For example, as illustrated in FIG. 12, the height adjustment mechanism may be a height adjustment mechanism 100 using a conversion mechanism that converts horizontal displacement to heightwise displacement. The hinge mechanism 40 illustrated in FIG. 12 includes the rotational supporting section 60 including the holding section 70 and the rotary fulcrum section 80, and the height adjustment mechanism 100. A hinge mechanism in this modified example has the same configuration as the hinge mechanism 40 in the embodiment except for the height adjustment mechanism 100. For this reason, the configuration of the height adjustment mechanism 100 will be mainly described below. The height adjustment mechanism 100 illustrated in FIG. 12 includes a vertically movable slider 101, a wedge-like guide member 102 having an upper inclined face 102A parallel to an inclined face 101A formed on a lower face of the slider 101, and an adjustment section 91 that moves the guide member 102 in the horizontal direction. The slider 101 has a supporting section 101B that supports the supported sections 89 of the rotary fulcrum section 80. The slider 101 can be guided in a first rail 103 extending in the vertical direction Z and raise of lower in the height direction Z1. The adjustment section 91 moves in the adjustment direction Y1 crossing (for example, orthogonal to) the height direction Z1 in which the slider 101 raises and lowers. The adjustment section 91 is the adjustment screw 95 that is movable in the adjustment direction Y1. The inclined face 101A of the slider 101 abuts the inclined face 102A of the guide member 102. The guide member 102 can be guided in a second rail 104 extending in the adjustment direction Y1 and move in the adjustment direction Y1. The adjustment screw 95 is held in the state where its shaft is screwed into the screw holding section 96. A tip of the shaft section of the adjustment screw 95 is coupled to the guide member 102 to be relatively rotatable. The guide member 102 may be biased by a spring (not illustrated) as an example of a biasing member to lower the slider 101.

When the operator pushes the adjustment screw 95 by use of a tool such as screwdriver, the guide member 102 moves in a +Y1 direction in FIG. 12, resulting in that the guide member 102 further enters below the slider 101 to raise the slider 101. This raises the rotary fulcrum section 80 having the supported sections 89 supported by the supporting section 101B of the slider 101. When the operator pulls back the adjustment screw 95 by operating the adjustment screw 95 with the tool, the guide member 102 moves in a -Y1 direction in FIG. 12, resulting in that the guide member 102 enters less below the slider 101 to lower the slider 101. This lowers the rotary fulcrum section 80 having the supported sections 89 supported by the supporting section 101B of the slider 101. In this manner, the operator uses the height adjustment mechanism 100 to adjust the height of the rotary fulcrum section 80 relative to the holding section 70, thereby adjusting the height of the automatic document feeder 22 relative to the document bed 21.

The height adjustment mechanism 100 overlaps the holding section 70 and the rotary fulcrum section 80 in the vertical direction Z. As illustrated in FIG. 12, in the vertical direction Z, the range R3 of the height adjustment mechanism 90 overlaps the range R1 of the holding section 70 and the range R2 of the rotary fulcrum section 80. This overlap condition is satisfied irrespective of the height of the slider 101. For this reason, even when the height adjustment mechanism 100 is provided, the hinge mechanism 40 including the holding section 70, the rotary fulcrum section 80, and the height adjustment mechanism 100 is unlikely to become large in the height direction. That is, as compared to the conventional hinge mechanism in which the height adjustment mechanism is disposed below the holding section 70, the hinge mechanism 40 having such height adjustment mechanism 100 can suppress upsizing more easily. The conversion mechanism of the height adjustment mechanism 100 in FIG. 12 is merely an example, and may adopt any other mechanism capable of converting horizontal displacement into heightwise displacement. In addition, the height adjustment mechanism 100 that changes the height of the rotary fulcrum section 80 relative to the holding section 70 only needs to overlap the holding section 70 and the rotary fulcrum section 80 in the vertical direction Z. With such configuration, an increase in the size of the image reading apparatus 20 in the height direction can be suppressed, and the same effects as the effects (1) to (6) of the embodiment can be obtained.

In the embodiment, the entire height adjustment mechanism 90 overlaps the holding section 70 and the rotary fulcrum section 80 in the vertical direction Z and however, a part of the height adjustment mechanism 90 may overlap the holding section 70 and the rotary fulcrum section 80 in the vertical direction Z. For example, the entire height adjustment mechanism 90 may overlap the holding section 70 in the vertical direction Z and a part of the height adjustment mechanism 90 overlap the rotary fulcrum section 80 in the vertical direction Z. Also with this configuration, an increase in the size of the image reading apparatus 20 to which the hinge mechanism 40 is assembled in the height direction can be suppressed. A part of the height adjustment mechanism 90 may overlap the holding section 70 in the vertical direction Z and a part or whole of the height adjustment mechanism 90 may overlap the rotary fulcrum section 80 in the vertical direction Z. In this case, as long as the height adjustment mechanism 90 overlaps the holding section 70 in the vertical direction Z in the state where a part of the lower end of the height adjustment mechanism 90 is located above or the same level as the lower end of the holding section 70, an increase in the size of the image reading apparatus 20 to which the hinge mechanism 40 is assembled in the height direction can be suppressed.

For example, in the embodiment, by shortening the sliding section 81 of the rotary fulcrum section 80, only a part of the height adjustment mechanism 90 may overlap the rotary fulcrum section 80 in the vertical direction Z (hereinafter referred to as configuration A).

For example, in the embodiment, by extending a portion located above the shaft section 93 of the rotator 92 in the vertical direction Z, only a part of the height adjustment mechanism 90 may overlap the holding section 70 in the vertical direction Z (hereinafter referred to as configuration B).

For example, both the configuration A and the configuration B in the above-mentioned two modification examples may be adopted such that only a part of the height adjustment mechanism 90 overlaps the rotary fulcrum section 80 in the vertical direction Z and only a part of the height adjustment mechanism 90 overlaps the holding section 70 in the vertical direction Z.

In the embodiment, a portion located above the shaft section 93 that is the rotary fulcrum of the rotator 92 may be pushed by the adjustment section 91 (for example, the adjustment screw 95) moving in the adjustment direction Y1. The conversion mechanism for converting displacement at the operation of the adjustment section 91 into displacement in the vertical direction Z may be limited to the rotational type using the rotator 92 and the sliding type using a wedge-like member, and may be a lever type using the action of a lever. For example, a lever having a fulcrum at its lower side is disposed, an adjustment screw is provided at a power point of the lever, and a slider that is displaceable in the vertical direction Z is provided at an action point of the lever. The advancing or retreating direction of the adjustment screw is the vertical direction Z, and the moving direction of the slider is also the vertical direction Z. With this configuration, the height of the rotary fulcrum section 80 relative to the holding section 70 can be adjusted by operating the adjustment screw with a head oriented upward is exposed when the rear cover 29 is opened, by use of a tool to raise or lower the slider via the lever.

Three or more hinge mechanisms 40 that couples the document bed 21 to the document bed cover 23 may be provided. Only one of the three or more hinge mechanisms may be the hinge mechanism 40 having the height adjustment mechanisms 90, 100.

In the embodiment and modification examples, the hinge mechanism 40 has the height adjustment mechanism 90 or 100 and however, the height adjustment mechanism may be different from the hinge mechanism 40 in configuration. For example, the hinge mechanisms 41, 42 are configured of the holding section 70 and the rotary fulcrum section 80 that is attached to the holding section 70 and provided to be movable in the up-down direction with respect to the holding section 70. The height adjustment mechanism 90 includes a second holding section, a movable member that is attached to the second holding section and vertically movable with respect to the second holding section, a displaceable member provided to be displaceable with respect to the second holding section, an abutment section that abuts a supporting section provided at the displaceable member and provided at the movable member, and an adjustment section that vertically displaces the supporting section of the displaceable member. The second holding section is fixed to a position of the rear frame 52 of the document bed 21 to which the holding section 70 is fixed, which is different from the position where the holding section 70 is fixed, and the movable member is fixed to the document bed cover 23. The supporting section of the displaceable member is displaced in the vertical direction Z by the adjustment section of the height adjustment mechanism, thereby adjusting the height of the opening/closing member (for example, the automatic document feeder 22) relative to the document bed 21. At this time, depending on the adjusted height of the opening/closing member relative to the document bed 21, the hinge mechanisms 41, 42 relatively moves the holding section 70 and the rotary fulcrum section 80 in the vertical direction Z. As described above, even if the hinge mechanisms 41, 42 are distinct from the height adjustment mechanism, as long as the height adjustment mechanism overlaps the holding section 70 and the rotary fulcrum section 80 in the vertical direction Z, an increase in the size of the image reading apparatus 20 in the height direction can be suppressed.

The opening/closing member of the image reading apparatus 20 may be the document bed cover 23 without including the automatic document feeder 22. That is, the image reading apparatus 20 may include the document bed 21 and the plate-like document bed cover 23. With this configuration, the weight of the document bed cover 23 is reduced due to the absence of the automatic document feeder 22. Thus, irrespective of the lowered need of height adjustment of the opening/closing member, by adopting the hinge mechanism 40 having the height adjustment mechanism capable of adjusting the height of the document bed cover 23, an increase in the size of the image reading apparatus 20 in the height direction can be suppressed.

The image reading apparatus 20 is not limited to a part of the multifunctional printer 11. The image reading apparatus 20 may be a flat bed-type pf scanner including the document bed 21 and the document bed cover 23 without having the printing function. In this case, the document bed cover 23 may be a scanner that mounts the automatic document feeder 22.

Technical concepts and their actions and effects that derived from the above-described embodiment and modification examples will be described below.

(A) An image reading apparatus includes: a document bed on which a document is placed; an opening/closing member configured to be opened/closed with respect to the document bed; a rotational supporting section provided at one end of the document bed and rotatably supports the opening/closing member with respect to the document bed; and a height adjustment mechanism that adjusts a height of the opening/closing member relative to the document bed. The rotational supporting section includes: a holding section fixed to the document bed; and a rotary fulcrum section attached to the holding section and configured to be moved in the up-down direction relative to the holding section. The height adjustment mechanism adjusts a height of the rotary fulcrum section relative to the holding section to adjust the height of the opening/closing member relative to the document bed and overlaps the holding section and the rotary fulcrum section in a vertical direction. With this configuration, the height of the hinge mechanism is adjusted while suppressing an increase in the size of the image reading apparatus.

(B) In the above-described image reading apparatus, the height adjustment mechanism may move the rotary fulcrum section relative to the holding section. With this configuration, since the height adjustment mechanism is configured to move the rotary fulcrum section relative to the holding section, the portion of the height adjustment mechanism, which is located below the holding section, can be further reduced or eliminated. Hence, an increase in the size of the portion configured of the holding section, the rotary fulcrum section, and the height adjustment mechanism in the height direction can be further suppressed.

(C) In the above-described image reading apparatus, the height adjustment mechanism may include: a rotator configured to rotate with respect to the holding section; a rotary fulcrum of the rotator; and an adjustment section configured to be move in a direction orthogonal to a direction in which an axis of the rotary fulcrum extends, the adjustment section making contact with the rotator in the orthogonal direction to change an rotation amount of the rotator. The rotator may have a supporting section that supports the rotary fulcrum section, and the adjustment section may be moved to change the rotation amount and a height of the supporting section may be adjusted.

With this configuration, the height of the rotational supporting section is rotationally adjusted by the adjustment operation of moving the adjustment section to rotate the rotator, enabling downsizing and fine adjustment. For example, in the configuration in which the height of the rotary fulcrum section is adjusted using the conversion mechanism for converting horizontal displacement into heightwise displacement, when it is attempted to make fine adjustment by decreasing the amount of horizontal displacement relative to the amount of heightwise displacement, for example, the inclination of the inclined face of a horizontally displaced member needs to be small. When the inclination of the inclined face is small, this member is likely to become large in the horizontal direction. On the contrary, the configuration in which displacement of the adjustment section is converted into heightwise displacement by the rotation of the rotator enables fine displacement of the rotary fulcrum section in the height direction.

(D) In the above-described image reading apparatus, the rotary fulcrum section may have a supported section supported by the supporting section, the holding section may have a notch that can hold the supported section, and the supported section may be held by the notch to position the opening/closing member with respect to the document bed.

With this configuration, the notches can hold the supported sections to achieve positioning in the predetermined direction (Y axis direction).

(E) The image reading apparatus described above further includes a biasing member attached between the rotator and the holding section and applying a biasing force to the rotator so as to rotate in a first direction, and the adjustment section may prevent the rotator from rotating in the first direction while moving in the orthogonal direction to adjust the height. With this configuration, since the rotator is biased, positioning can be achieved in the state where the rotator abuts the adjustment section such as screw at all time, facilitating adjustment.

(F) In the above-described image reading apparatus, the adjustment section may be an adjustment screw with a screw head oriented to the one end. With this configuration, since the screw head is accessible from the back face-side of the apparatus, height adjustment is facilitated.

What is claimed is:

1. An image reading apparatus comprising:
    a document bed on which a document is placed;
    an opening/closing member configured to be opened/closed with respect to the document bed;
    a rotational supporting section provided at one end of the document bed and configured to support the opening/closing member to rotate with respect to the document bed; and
    a height adjustment mechanism that adjusts a height of the opening/closing member relative to the document bed, wherein
    the rotational supporting section includes
        a holding section fixed to the document bed, and
        a rotary fulcrum section attached to the holding section and configured to be moved in an up-down direction relative to the holding section,
    the height adjustment mechanism
        includes a rotator rotating about a rotating axis with respect to the holding section,
        adjusts a height of the rotary fulcrum section relative to the holding section to adjust the height of the opening/closing member relative to the document bed based on a rotation of the rotator about the rotating axis, and
        overlaps the holding section and the rotary fulcrum section in a vertical direction, and
    the holding section and the rotating axis of the rotator are not moved with respect to the document bed while the rotary fulcrum is moved in the up-down direction.

2. The image reading apparatus according to claim 1, wherein the height adjustment mechanism moves the rotary fulcrum section relative to the holding section.

3. The image reading apparatus according to claim 1, wherein
    the height adjustment mechanism includes
        a rotary fulcrum of the rotator, and
        an adjustment section configured to be move in an orthogonal direction orthogonal to a direction in which an axis of the rotary fulcrum extends, the adjustment section making contact with the rotator in the orthogonal direction to change a rotation amount of the rotator,
    the rotator has a supporting section that supports the rotary fulcrum section, and
    the adjustment section is moved to change the rotation amount and a height of the supporting section is adjusted.

4. The image reading apparatus according to claim 3, wherein
    the rotary fulcrum section has a supported section supported by the supporting section,
    the holding section has a notch configured to hold the supported section, and
    the supported section is held by the notch to position the opening/closing member with respect to the document bed.

5. The image reading apparatus according to claim 3, further comprising
    a biasing member attached between the rotator and the holding section and applying a biasing force to the rotator so as to rotate in a first direction, wherein
    the adjustment section prevents the rotator from rotating in the first direction while moving in the orthogonal direction to adjust the height.

6. The image reading apparatus according to claim 3, wherein the adjustment section is an adjustment screw with a screw head oriented to the one end.

7. The image reading apparatus according to claim 1, wherein the height adjustment mechanism adjusts a height of the rotary fulcrum section relative to the holding section to adjust the height of the opening/closing member relative to the document bed along the up-down direction.

8. The image reading apparatus according to claim 1, wherein while the opening/closing member opens and closes, a rotation center of the opening/closing member does not move in the vertical direction.

9. The image reading apparatus according to claim 1, wherein the height adjustment mechanism is configured to adjust the height of the rotary fulcrum section relative to the holding section without opening or closing the opening/closing member.

* * * * *